(12) United States Patent
Savalle et al.

(10) Patent No.: US 10,826,772 B2
(45) Date of Patent: Nov. 3, 2020

(54) REMOVAL OF ENVIRONMENT AND LOCAL CONTEXT FROM NETWORK TRAFFIC FOR DEVICE CLASSIFICATION

(71) Applicant: Cisco Technology, Inc., San Jose, CA (US)

(72) Inventors: Pierre-André Savalle, Rueil-Malmaison (FR); Jean-Philippe Vasseur, Saint Martin D'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 11 days.

(21) Appl. No.: 16/188,452

(22) Filed: Nov. 13, 2018

(65) Prior Publication Data
US 2020/0153694 A1    May 14, 2020

(51) Int. Cl.
*H04L 12/24*    (2006.01)
*H04L 29/08*    (2006.01)
*G06N 20/00*    (2019.01)

(52) U.S. Cl.
CPC ...... *H04L 41/0893* (2013.01); *H04L 41/0806* (2013.01); *H04L 67/12* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 9,739,868 B2 | 8/2017 | Baxley et al. | |
| 2015/0007173 A1* | 1/2015 | Ionescu | G06F 9/45533 718/1 |
| 2016/0232195 A1* | 8/2016 | Davis | G06F 16/2365 |
| 2017/0104633 A1* | 4/2017 | Wen | H04W 24/08 |
| 2017/0134404 A1* | 5/2017 | Machlica | H04L 63/1416 |
| 2017/0279829 A1 | 9/2017 | Vasseur et al. | |
| 2017/0364702 A1* | 12/2017 | Goldfarb | H04L 41/12 |
| 2018/0048550 A1* | 2/2018 | Beyah | G06F 15/16 |

(Continued)

OTHER PUBLICATIONS

Kulin, et al., "Data-Driven Design of Intelligent Wireless Networks: An Overview and Tutorial", Sensors 2016, pp. 1-61, 2016, MDPI.

(Continued)

*Primary Examiner* — Scott B Christensen
(74) *Attorney, Agent, or Firm* — Behmke Innovation Group LLC; Kenneth J. Heywood; Jonathon P. Western

(57) ABSTRACT

In one embodiment, a device classification service assigns a set of endpoint devices to a context group. The device classification service forms a context summary feature vector for the context group that summarizes telemetry feature vectors for the endpoint devices assigned to the context group. Each telemetry feature vector is indicative of a plurality of traffic features observed for the endpoint devices. The device classification service normalizes a telemetry feature vector for a particular endpoint device using the context summary feature vector. The device classification service classifies, using the normalized telemetry feature vector for the particular endpoint device as input to a device type classifier, the particular endpoint device as being of a particular device type.

20 Claims, 10 Drawing Sheets

(56) References Cited

U.S. PATENT DOCUMENTS

2019/0279113 A1* 9/2019 Liu ...................... H04L 41/145

OTHER PUBLICATIONS

Meidan, et al., "ProfilloT: A Machine Learning Approach for IoT Device Identification Based on Network Traffic Analysis", SAC'17, Apr. 3-7, 2017, Marrakech, Morocco, pp. 506-509, 2017, ACM.
Redondi, et al., "Building up knowledge through passive WiFi probes", Computer Communications 117, pp. 1-12, 2018, Elsevier B.V.

* cited by examiner

FIG. 5

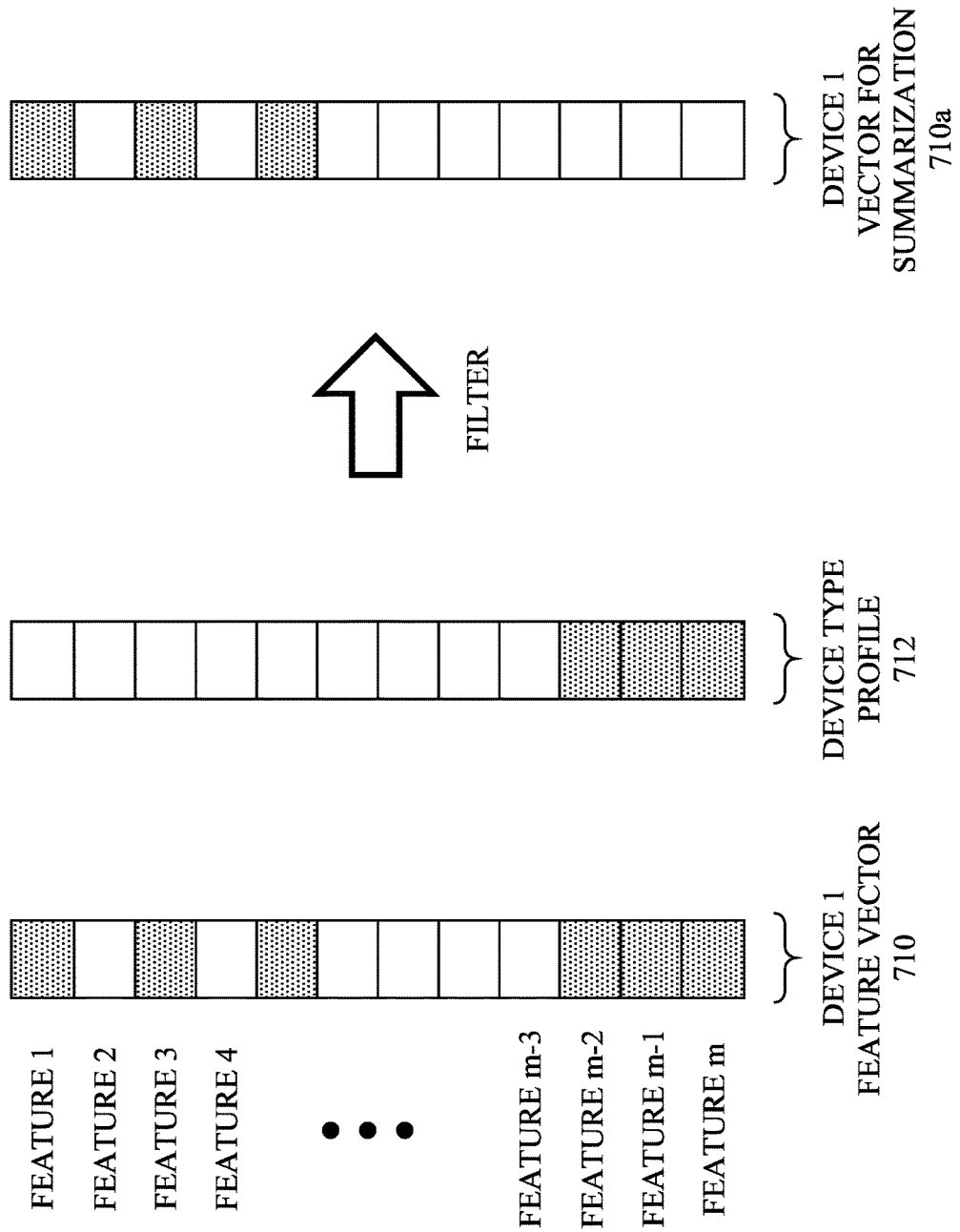

REMOVAL OF ENVIRONMENT AND LOCAL CONTEXT FROM NETWORK TRAFFIC FOR DEVICE CLASSIFICATION

TECHNICAL FIELD

The present disclosure relates generally to computer networks, and, more particularly, to the removal of environment and local context from network traffic for device classification.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

As more non-traditional devices join the IoT, networks may eventually evolve from a bring-your-own-device (BYOD) model to a model that enables bring-your-own-thing (BYOT), bring-your-own-interface (BYOI), and/or bring-your-own-service (BYOS) paradigms. In other words, as the IoT grows, the number of available services, etc., will also grow considerably. For example, a single person in the future may transport sensor-equipped clothing, other portable electronic devices (e.g., cell phones, etc.), cameras, pedometers, or the like, into an enterprise environment, each of which may attempt to access the wealth of new IoT services that are available on the network.

From a networking perspective, the network can automatically configure access control policies, other security policies, and the like, if the device type of a particular IoT device is known to the network. For example, the network may limit a particular type of sensor to only communicating with its supervisory. However, with the ever-increasing number and variety of IoT devices, it may also be the case that the device type is not initially known to the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example set of telemetry feature vectors for endpoint devices;

FIGS. 7A-7B illustrate examples of the summarization of telemetry feature vectors for a particular context.

DESCRIPTION OF EXAMPLE EMBODIMENTS

Overview

Figure 1A:
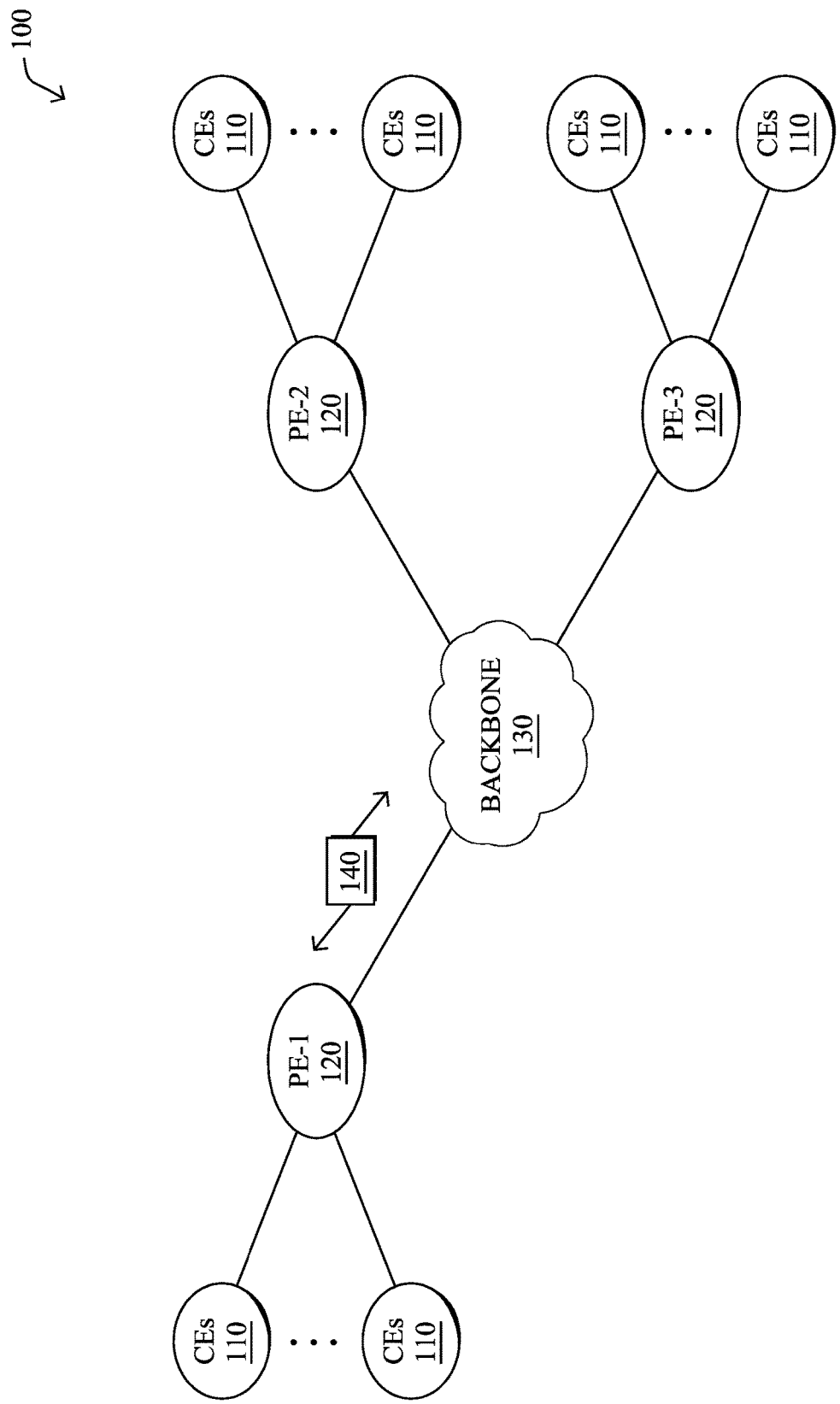
FIGS. 1A-1B illustrate an example communication network.

According to one or more embodiments of the disclosure, a device classification service assigns a set of endpoint devices to a context group. The device classification service forms a context summary feature vector for the context group that summarizes telemetry feature vectors for the endpoint devices assigned to the context group. Each telemetry feature vector is indicative of a plurality of traffic features observed for the endpoint devices. The device classification service normalizes a telemetry feature vector for a particular endpoint device using the context summary feature vector. The device classification service classifies, using the normalized telemetry feature vector for the particular endpoint device as input to a device type classifier, the particular endpoint device as being of a particular device type.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
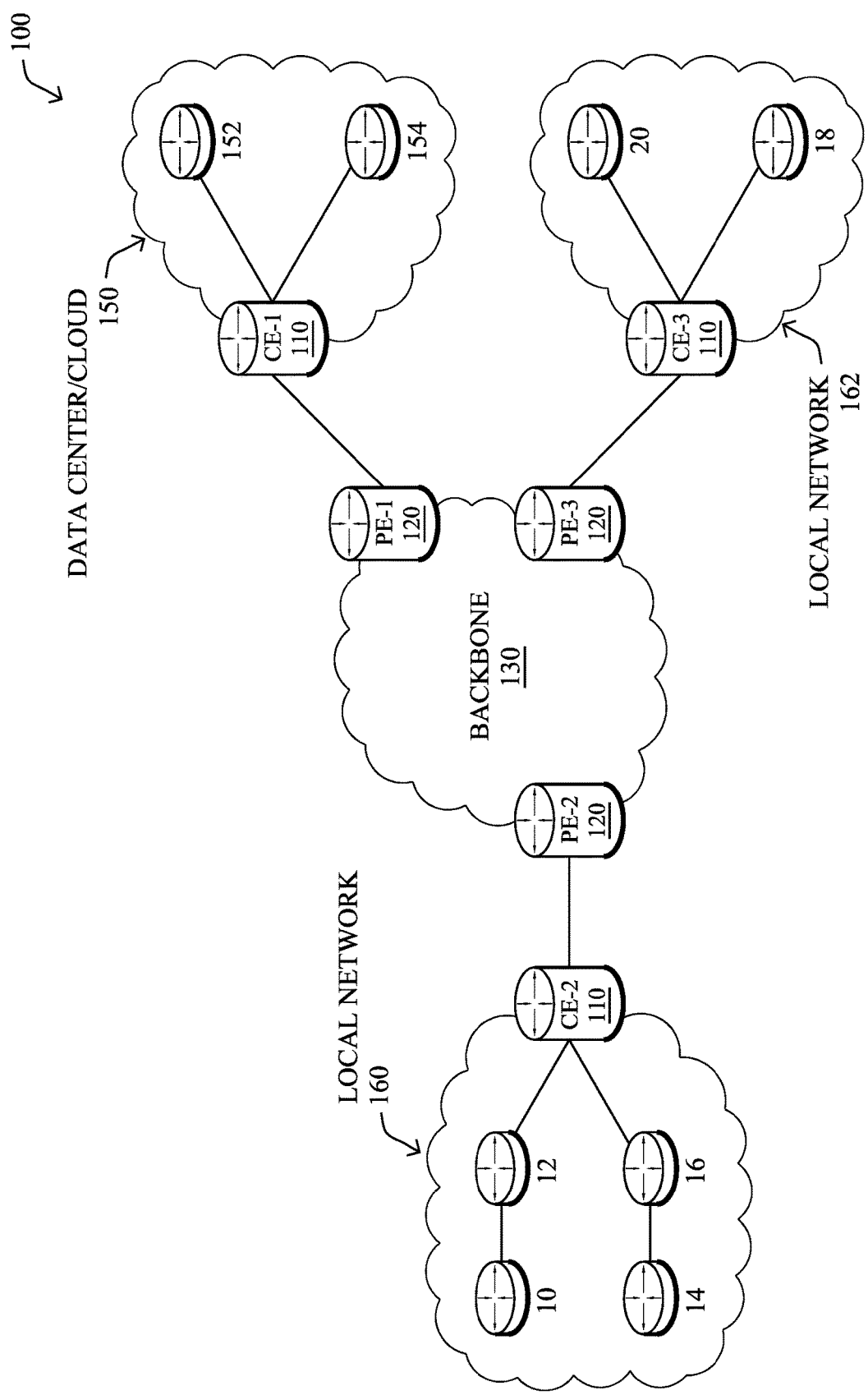

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
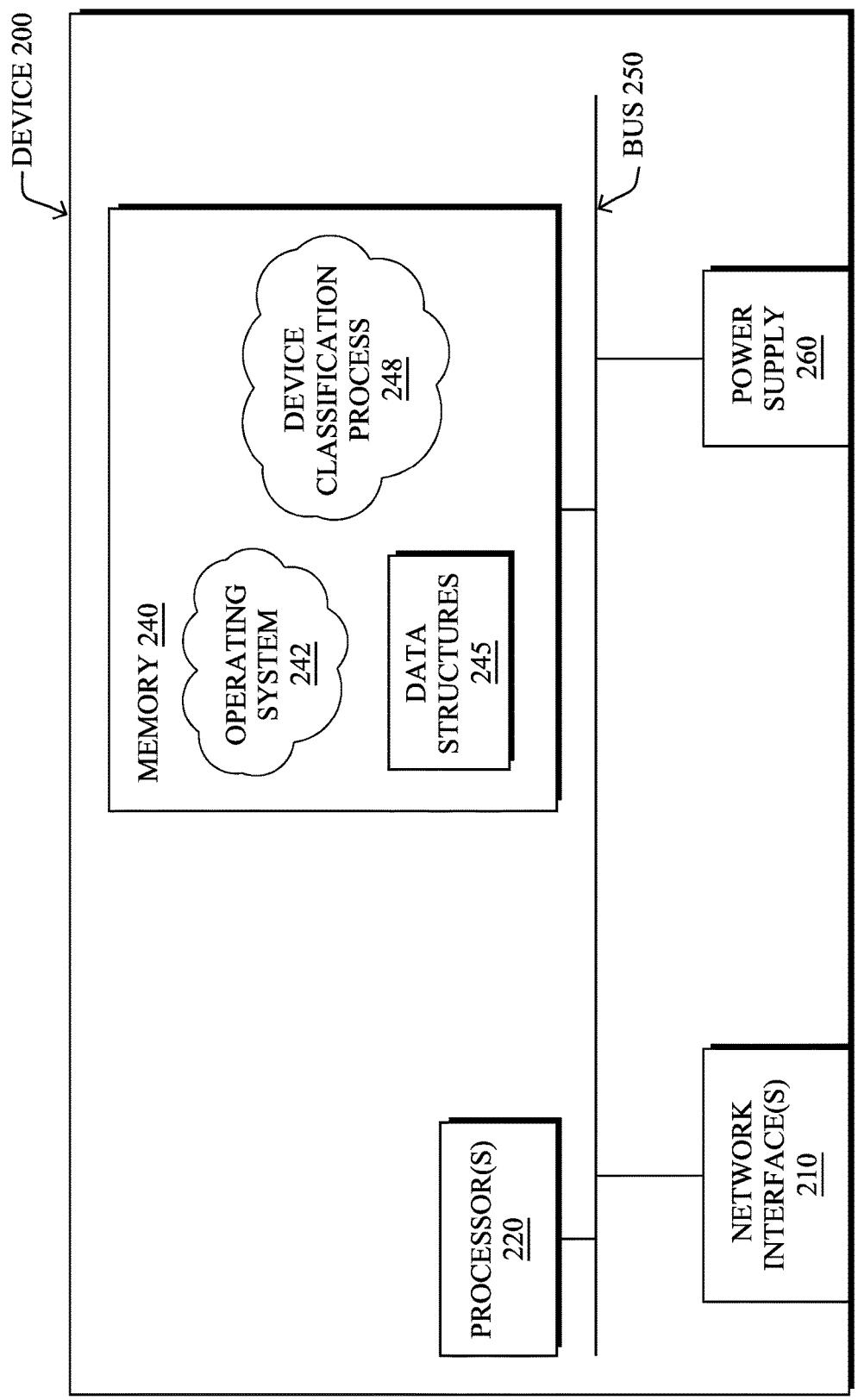
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device classification process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device classification process 248 may execute one or more machine learning-based classifiers to classify a device in a network, based on its corresponding network traffic. In one embodiment, device classification process 248 may assess captured telemetry data regarding one or more traffic flows involving the device, to determine the device type associated with the device. In further embodiments, device classification process 248 may classify the operating system of the device, based on its captured traffic telemetry data.

Device classification process 248 may employ any number of machine learning techniques, to classify the gathered telemetry data and apply a device type label to a device associated with the traffic. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device classification process 248 can use the model M to classify new data points, such as information regarding new traffic flows in the network. Often, M is a statistical model, and the cost function is inversely proportional to the likelihood of M, given the input data.

In various embodiments, device classification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "iPhone 6," or "iOS 10.2." On the other end of the spectrum are unsupervised techniques that do not require a training set of labels. Notably, while a supervised learning model may look for previously seen patterns that have been labeled as such, an unsupervised model may attempt to analyze the data without applying a label to it. For example, supervised learning can be used to cluster devices that behave similarly to one another, based on their captured telemetry data. Semi-supervised learning models take a middle ground approach that uses a greatly reduced set of labeled training data.

Example machine learning techniques that device classification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as associated with a particular device type (e.g., make and/or model, version, operating system, etc.). Conversely, the false negatives of the model may refer to the number of traffic flows that the model incorrectly classifies as belonging to a certain device type. True negatives and positives may refer to the number of traffic flows that the model correctly classifies as not being of a certain class or being of a certain class, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, device classification process 248 may assess the captured telemetry data on a per-flow basis. In other embodiments, device classification process 248 may assess telemetry data for a plurality of traffic flows based on any number of different conditions. For example, traffic flows may be grouped based on their sources, destinations, temporal characteristics (e.g., flows that occur around the same time or within the same time window, etc.), combinations thereof, or based on any other set of flow characteristics.

Figure 3:
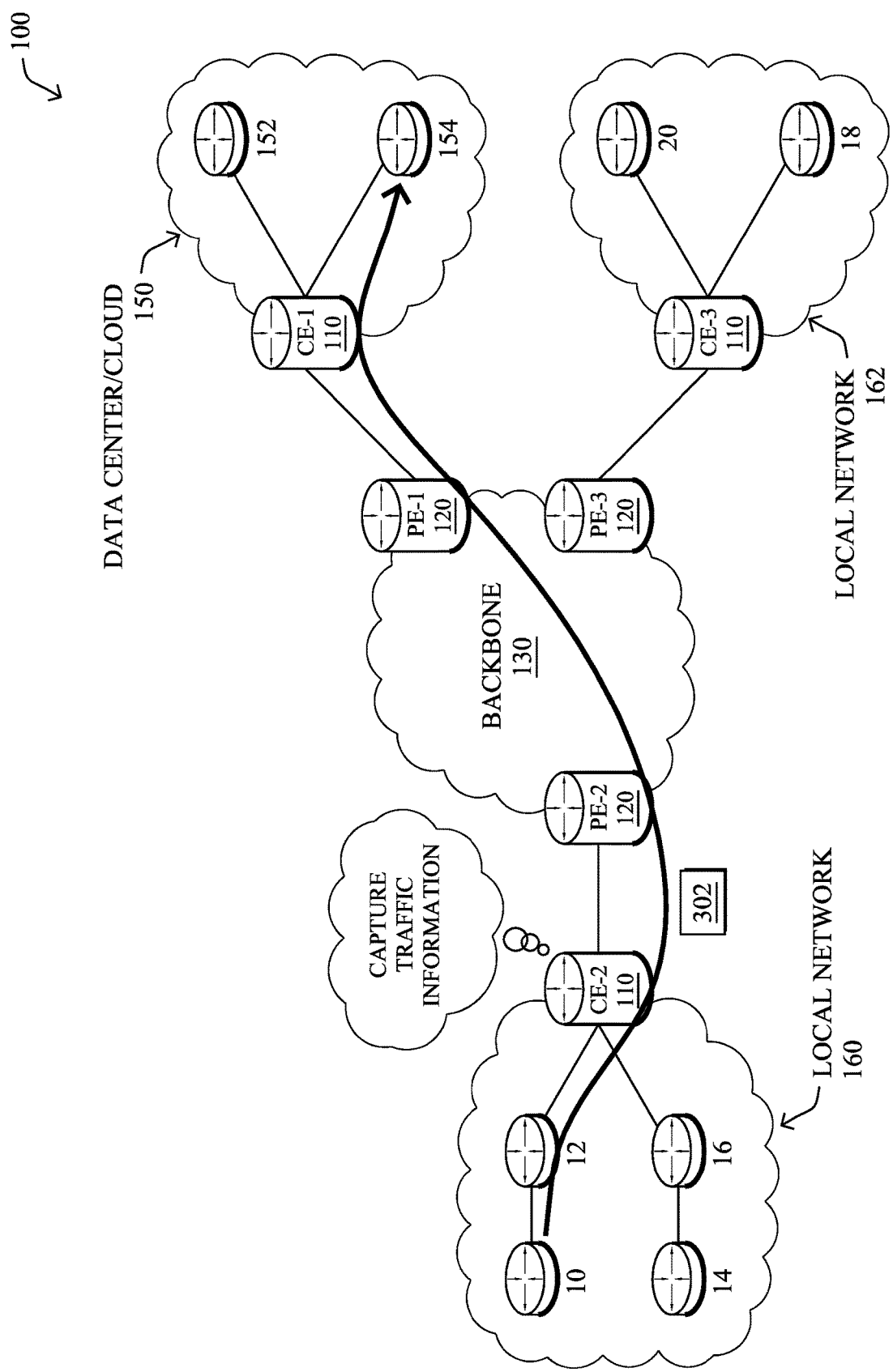
FIG. 3 illustrates an example of the capture of traffic telemetry data.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, the hostname of server 154, and/or other header information by analyzing the header of a packet 302. Example captured features may include, but are not limited to, Transport Layer Security (TLS) information (e.g., from a TLS handshake), such as the ciphersuite offered, User Agent information, destination hostname, TLS extensions, etc., HTTP information (e.g., URI, etc.), Domain Name System (DNS) information, ApplicationID, virtual LAN (VLAN) ID, or any other data features that can be extracted from the observed traffic flow(s). Further information, if available could also include process hash information from the process on host node 10 that participates in the traffic flow.

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302.

Figure 4:
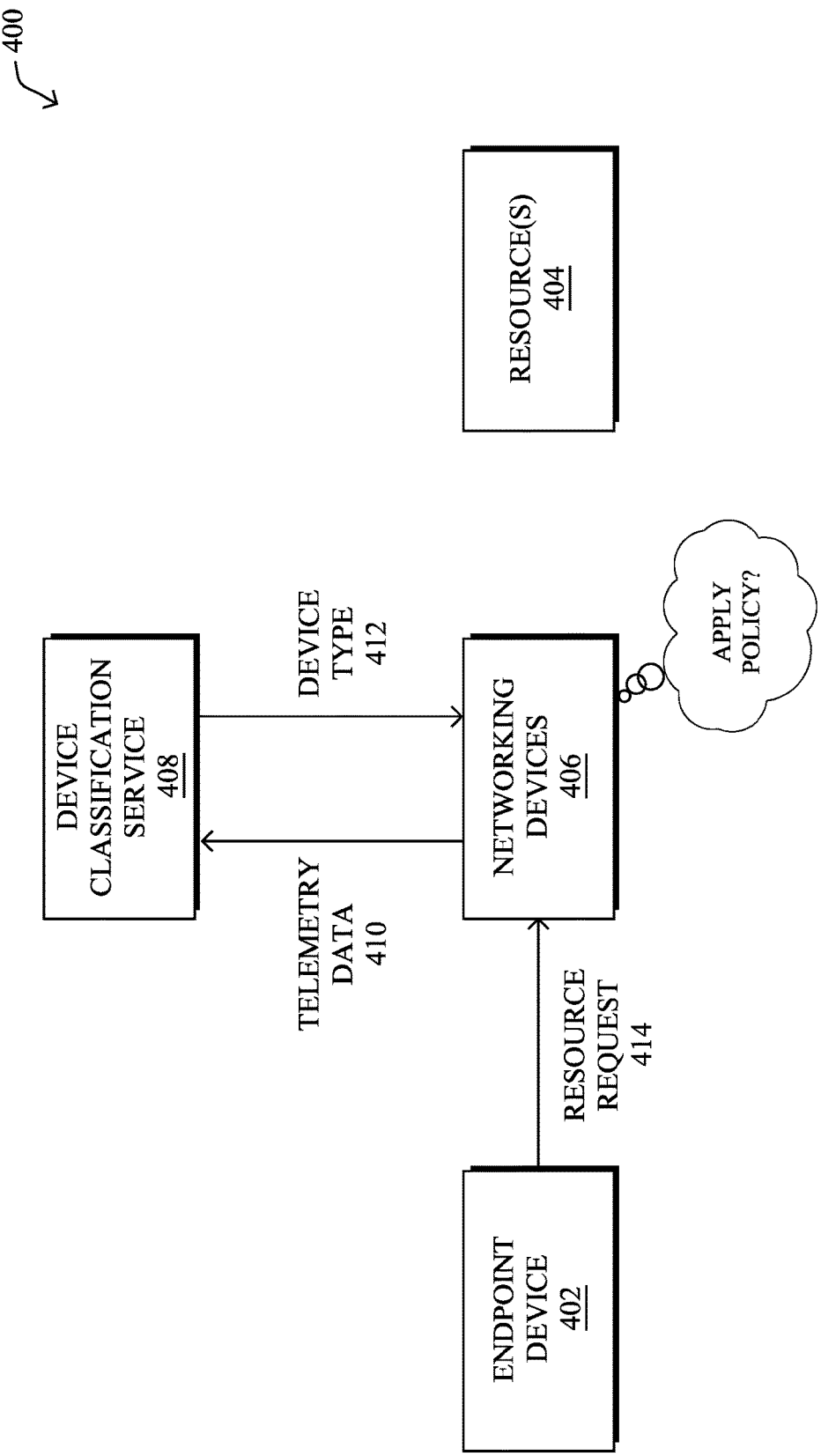
FIG. 4 illustrates an example of a device classification service in a network.

FIG. 4 illustrates an example of a device classification service in a network, in various embodiments. As shown, network 400 may generally include an endpoint device 402 (e.g., a user device, a sensor, an actuator, etc.), any number of resources 404, and any number of networking devices 406 that are configured to provide connectivity between endpoint device 402 and resource(s) 404. For example, networking devices 406 may include access points, wireless LAN controllers (WLCs), switches, routers, security devices (e.g., firewalls, etc.), access points (APs), and the like. Network resources 404 may include cloud-based services, specific servers or other endpoints, webpages, or any other resource with which endpoint device 402 could communicate.

Also as shown in FIG. 4 is a device classification service 408 that may be hosted on one or more of networking devices 406 or be in communication therewith. In general, device classification service 408 is configured to take as input telemetry data 410 captured by networking device 406 regarding network traffic associated with endpoint device 402 and, based on the captured telemetry, identify the device type 412 of endpoint device 402. For example, device type 412 may indicate the operating system (e.g., iOS, Android, etc.), manufacturer (e.g., Apple, Samsung, etc.), make (e.g., iPhone, etc.), model (e.g., 5s, 6, 7, etc.), function (e.g., thermostat, temperature sensor, etc.), or any other information that can be used to categorize endpoint device 402.

Note that the classification of endpoint device 402 by device classification service 408 can also, in some embodiments, be of varying specificity, depending on the telemetry data 410 available to service 408 and/or its degree of confidence in a particular classification. For example, device classification service 408 may determine, with a high degree of confidence, that endpoint device 402 is an Apple iPhone, but may or may not be able to determine whether device 402 is an iPhone 5s or an iPhone 6. Accordingly, in some embodiments, service 408 may also return the confidence values for the classification label(s) in device type 412 to networking device 406.

The labeling of endpoint device 402 with a device type 412 by device classification service 408 may initiate enforcement of one or more network policies by networking device 406 with respect to endpoint device 402. Such network policies may include, but are not limited to, security policies, network traffic or quality of service (QoS) policies, access polices, and the like. For example, as shown, assume that endpoint device 402 sends out a resource request 414 for a particular one of resources 404. In turn, networking devices 406 may determine whether to allow or block resource request 414 from reaching its target resource 404, based on the policy associated with the determined device type 412 of endpoint device 402. For example, if endpoint device 402 is determined to be a smart thermostat, it may be prevented from accessing certain online resources, such as an email service. Similarly, if endpoint device 402 is determined to be a safety-related sensor, a traffic or QoS policy associated with device type 412 may cause networking devices 406 to assign a higher priority to traffic from endpoint device 402.

In general, device classification (also known as "device profiling") to identify the device type of a device under scrutiny has traditionally used static rules and heuristics for the determination. In further embodiments, the device classification can be achieved by applying a trained machine learning-based classifier to the captured telemetry data for an endpoint device. Such telemetry can also take the form of information captured through active and/or passive probing of endpoint devices, to assign a device type and corresponding host profile to a device. Notably, this probing may entail sending any or all of the following probes:

DHCP probes with helper addresses
SPAN probes, to get messages in INIT-REBOOT and SELECTING states, use of ARP cache for IP/MAC binding, etc.
Netflow probes
HTTP probes to obtain information such as the OS of the device, Web browser information, etc.
RADIUS probes
SNMP to retrieve MIB object or receives traps
DNS probes to get the Fully Qualified Domain Name (FQDN)
etc.

A device classification service may even trigger active scanning of the network and SNMP scanning when the default community string is set to public. This can be done, for example, to retrieve the MAC address of the device or other types of information. Such a variety to probes allows for the gathering of a rich set of information that can be used for device profiling. A degree of confidence can also be assigned to any such device type classifications. Note also that the device profiling can be performed at multiple points in the network, such as by wireless LAN controllers (WLCs) in addition to, or in lieu of, a centralized service.

In many networks, the number of devices that fall into the 'UNKNOWN' device type category has been found to be as high as 40%. In other words, up to 40% of the devices on a given network may not match any existing device profiling rules in use. This is expected to grow over time, illustrating the need for a more dynamic device profiling approach. Indeed, it is estimated that the number of endpoint devices will reach 3.6 billion by 2021.

As noted above, identifying the type of endpoint devices on a computer network is key to enforcing fine-grained policies, detecting security issues, and optimizing performance. Unfortunately, this is a difficult problem, as most devices do not just report their identity to the network. Accordingly, the network may rely on a device classification service that uses heuristics, rules, statistical models, or even machine learning, to classify an endpoint device based on its observed traffic in the network.

In practice, telemetry data regarding network traffic for an endpoint device is a superposition of two types of data: 1.) traffic telemetry data that is really specific to the endpoint device, in that it can be used to classify the endpoint device and 2.) traffic telemetry data that is specific to the environment or location of the endpoint device. For instance, observing traffic of wireless devices may reveal the use of protocols like EAPOL, 802.11, etc. Similarly, observing traffic in certain types of labs or offices may yield broadcast traffic from neighboring devices.

A given device may also be moved from one environment to another, leading to drastic changes in terms of observed traffic. For example, an endpoint device may move from a given VLAN to another, move from one MAC layer to another (e.g., Wi-Fi to Ethernet or vice-versa), move to a new IPsec tunnel, etc. In such cases, the protocols used by the endpoint device would be very different, greatly increasing the chances of the device classification service confusing the actual device type of endpoint with that of another device type. Note that this is not limited to the lower network layers, either: new applications may be installed and existing protocols may be used in a different mode (e.g., TCP, SCTP, etc.).

In some cases, it may be possible to manually construct a whitelist and/or blacklist of certain telemetry features based on whether or not they are considered "environmental." However, doing so would be very difficult to do in a consistent and comprehensive way. In addition, a manual approach may miss some specific environmental settings that are just not common enough to be considered. In the aggregate, this can still lead to a significant number of endpoint devices being misclassified because of noisy traffic features.

Removal of Environment and Local Context from Network Traffic for Device Classification The techniques herein introduce a method for building robust device classification systems by automatically normalizing network traffic representations based on the local environment of the device, to really emphasize device-specific features over features attributable to the location/environment of the device. This allows for a more accurate device type classification of the endpoint device and can easily be generalized to different environments and locations Specifically, according to one or more embodiments of the disclosure as described in detail below, a device classification service assigns a set of endpoint devices to a context group. The device classification service forms a context summary feature vector for the context group that summarizes telemetry feature vectors for the endpoint devices assigned to the context group. Each telemetry feature vector is indicative of a plurality of traffic features observed for the endpoint devices. The device classification service normalizes a telemetry feature vector for a particular endpoint device using the context summary feature vector. The device classification service classifies, using the normalized telemetry feature vector for the particular endpoint device as input to a device type classifier, the particular endpoint device as being of a particular device type.

Illustratively, the techniques described herein may be performed by hardware, software, and/or firmware, such as in accordance with the device classification process 248, which may include computer executable instructions executed by the processor 220 (or independent processor of interfaces 210) to perform functions relating to the techniques described herein.

Operationally, the techniques herein introduce a method for building robust device classification services by automatically normalizing network traffic representations based on the local environment of the device, to emphasize device-specific traffic features. Doing so allows for the system to learn rules or classifiers that "generalize" more carefully. In addition, in the context of a device classification service that shares data across different networks, stripping the context is essential to being able to reuse classifiers across the different networks. The cost of a subject matter expert labeling one endpoint device with a device type is also large and the techniques herein allow the labeling system to make the most out of every single label collected.

Figure 5:
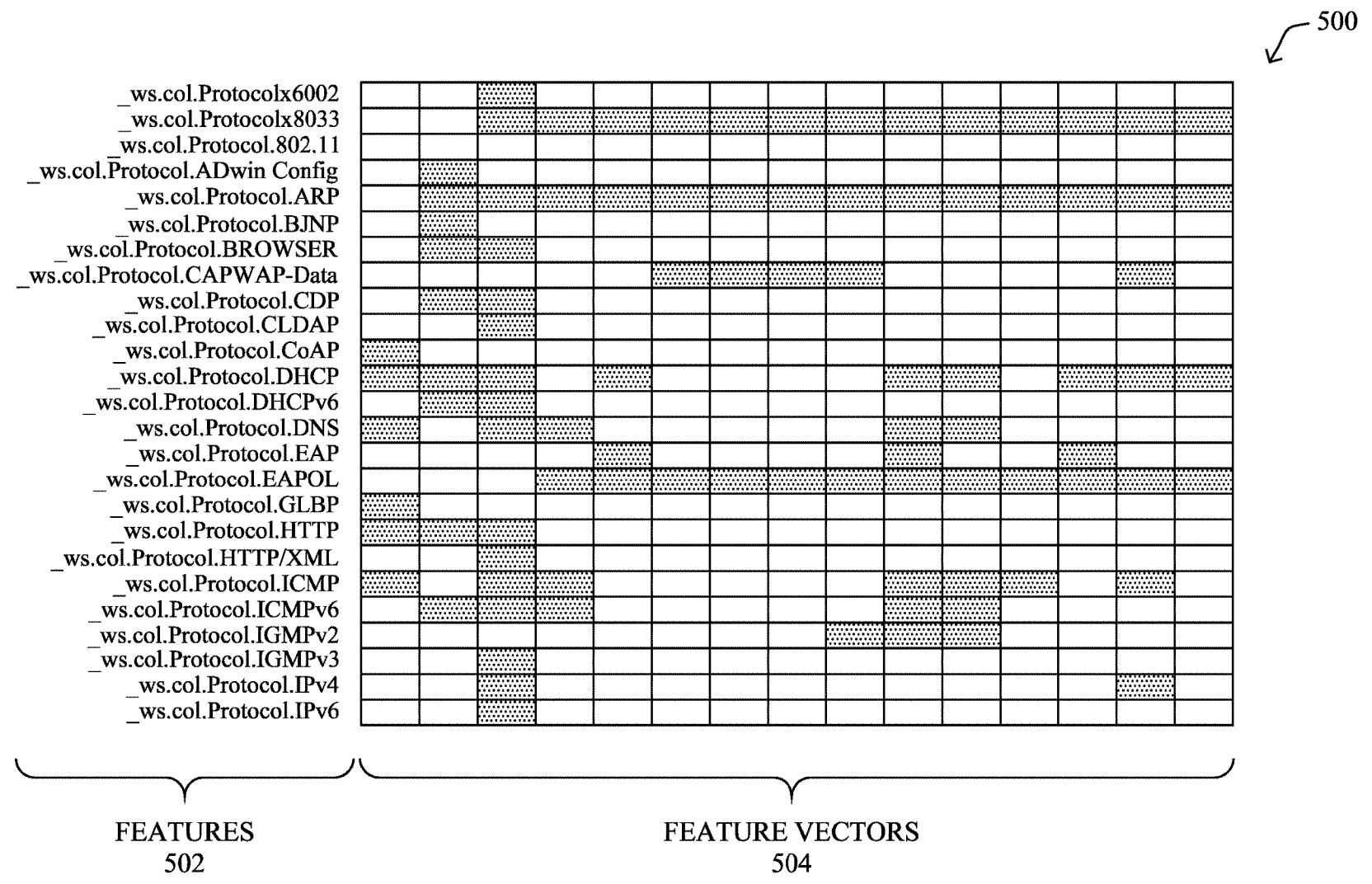

Preliminary experimentation has demonstrated that certain telemetry features are highly prevalent in specific environments, thus representing noise and potentially negatively impacting device type classifications by a machine learning-based classifier. FIG. 5 illustrates an example set 500 of telemetry feature vectors 504 for endpoint devices in a network. In general, each feature vector 504 may be associated with a specific endpoint device and include information regarding any number of potential traffic features 502 that may be observed in the traffic for that endpoint device. For example, each dimension of a feature vector 504 may represent the presence or absence of a certain protocol such as, but not limited to, IPv6, IPv4, IGMPv3, IGMPv2, ICMPv6, ICMP, HTTP/XML, HTTP, etc. In some cases, entries in a feature vector 504 may be on a binary basis, to indicate whether a given protocol was seen in the traffic of the endpoint device or not. In other cases, entries in a feature vector 504 may be more complex, such as assigning a weighting for each feature 502 based on the frequency at which that feature was observed in the traffic of the endpoint device or on any other criteria as desired.

By way of example, consider the first three feature vectors 504 in FIG. 5. As shown, entries in feature vectors 504 include binary indications as to whether a given feature 502 was observed in the traffic for their associated endpoint devices. In particular a shaded entry in feature vectors 504 indicates the presence of the corresponding feature 502 in the traffic of that endpoint device, while an empty entry indicate the absence of that feature in the traffic. For example, the first three feature vectors in feature vectors 504 indicate that their corresponding endpoint devices do not exhibit any 802.11 or EAPOL protocol activity and are likely from a wired lab. Some devices represented by feature vectors 504 correspond to a CAPWAP packet trace, leading to similar artifacts. V6 protocols are also sometimes present in feature vectors 504, although not always.

Figure 6:
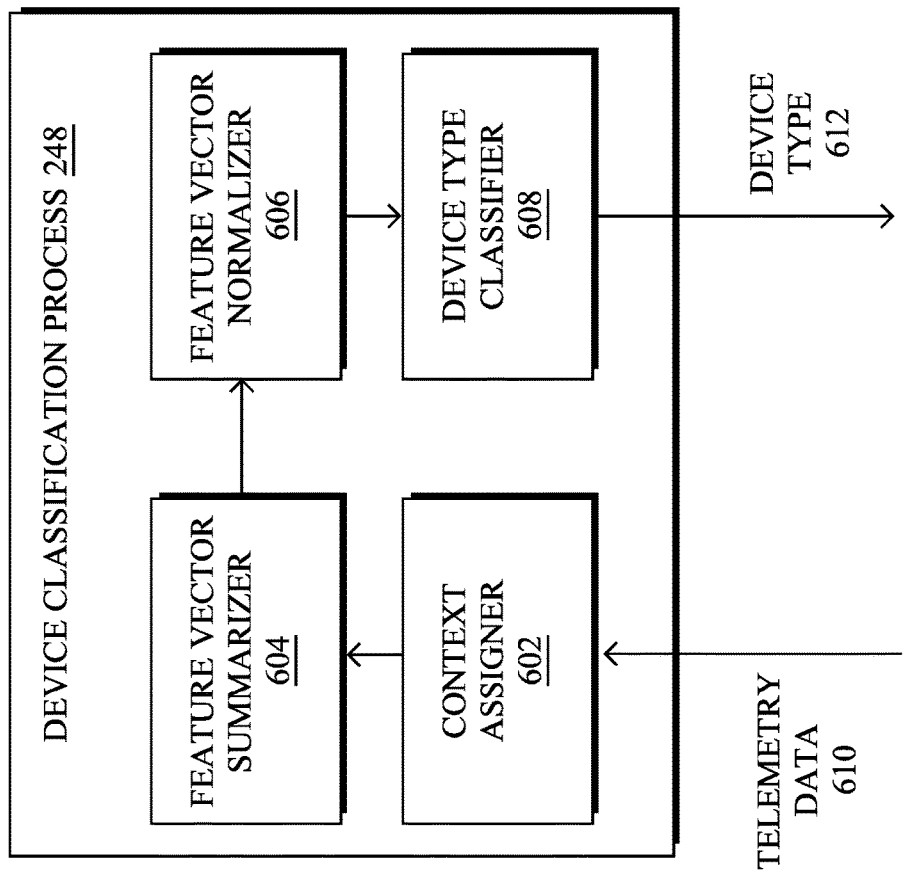
FIG. 6 illustrates an example architecture for the removal of context from network traffic for device classification.

Operationally, FIG. 6 illustrates an example architecture 600 for the removal of context from network traffic for device classification, according to various embodiments. As shown, device classification process 248, which may be used to provide a device classification service to one or more networks (e.g., service 408 shown in FIG. 4), may include any or all of the following components: a context assigner 602, a feature vector summarizer 604, a feature vector normalizer 606, and/or a device type classifier 608. These components 602-608 may be implemented in a distributed manner or implemented on a single device. In addition, some or all of components 602-608 may be implemented as part of a monitored network (e.g., on one or more networking device, a device in communication therewith, etc.) or part of a cloud-based service. The functionalities of the components of architecture 600 may also be combined, omitted, or implemented as part of other processes, as desired.

A first component of architecture 600 is device context assigner 602 that assigns endpoint devices to contexts, in various embodiments. As shown, context assigner 602 may assign an endpoint device to a given context based on the telemetry data 610 associated with the endpoint device, other information collected automatically from the network (e.g., location services, etc.), and/or information provided manually. In general, a context may signify the location/environment in which the endpoint device is located. More specific contexts may even signify the networking device(s) to which the endpoint device is associated, such as an access point, WLC, etc. For example, context assigner 602 may assign an endpoint device to different contexts such as "Access point X," but also to the more general context "wireless." In another example, context assigner 602 may assign all endpoint devices in a computing lab to the general context "Lab," as well as a more specific context, such as "Lab building X." Similarly, context assigner 602 may assign all endpoint devices in a public area to one or more contexts encoding this information.

As used herein, a context group refers to the set of endpoint devices assigned by context assigner 602 to a particular context. A fair assumption is that these contexts can be ordered from most specific to less specific by subject matter experts (SME). In other words, the contexts may belong to a hierarchy of contexts, such as "wireless-"→"wireless devices in Building B"→"wireless devices in Building B attached to access point Z." Generally, the set of endpoint devices assigned by context assigner 602 to a context group is expected to shrink as the context becomes more specific. Note also that an endpoint device may belong to multiple context groups, in most cases.

A second component of architecture 600 is feature vector summarizer 604 that is configured to summarize the network traffic of the endpoint devices under analysis by device classification process 248, in various embodiments. As noted above, telemetry data 610 captured regarding the network traffic of the endpoint devices may take the form of feature vectors, which may be computed prior to receipt by device classification process 248 or by process 248, itself. A single feature vector can encode anywhere from the contents of a single packet or flow for a given endpoint device to aggregated traffic telemetry for the device that is collected over a potentially long time window (e.g., hours, days, weeks, etc.).

At a high level, feature vector summarizer 604 may summarize the feature vectors of a set of endpoint devices assigned to a context group by context analyzer 602, by averaging what is common for all (or most) feature representations seen in this context for all endpoints in the context group. The specifics of how feature vector summarizer 604 summarizes these feature vectors will depend on the details of the systems and input features used. In addition, the feature vector summaries from feature vector summarizer 604 should also be constructed in a way that is consistent with the normalization performed by feature vector normalizer 606, as detailed below.

In one embodiment, feature vector summarizer 604 can generate a context summary feature vector by averaging the telemetry feature vectors of the endpoint devices in a context group. In the case where the feature vectors comprise binary indicators, where each coordinate indicates whether a given protocol or indicator has been seen in the device's traffic, the coordinates of the summary vector may be the empirical frequencies of each characteristic in the context. Feature vector summarizer 604 may also apply post processing to the averages, such as different forms of thresholding, to form the summarized feature vector. For example, feature vector summarizer 604 may only keep the N most frequent characteristics in the context, although selecting a good static value of N can be difficult. In another example, feature vector summarizer 604 may employ hard thresholding (i.e., setting to zero all frequencies smaller than a fixed threshold), which can be easier to work with, in practice, and leads to sparse summaries which is computationally more efficient.

Figure 7A:
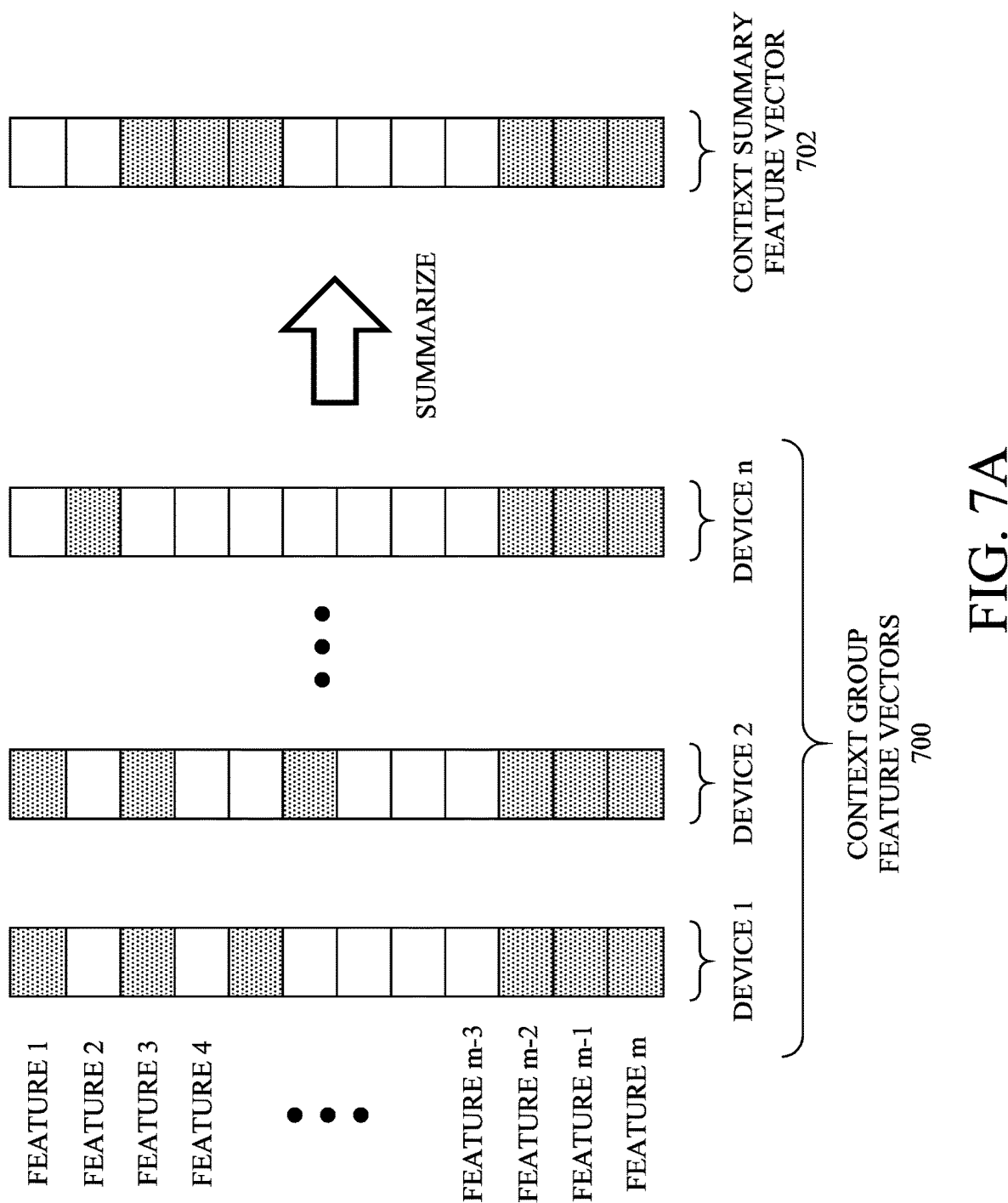

FIG. 7A illustrates an example of the summarization of telemetry feature vectors for a particular context, such as by feature vector summarizer 604. In FIG. 7A, assume that there are n-number of feature vectors 700 in a given context group of n-number of endpoint devices. Each feature vector shown may include m-number of dimensions, with each dimension including a binary indicator as to whether traffic for the corresponding endpoint device exhibited that traffic feature, such as the use of a specific protocol, etc., with a shaded vector entry indicating the presence of that feature.

Taking the set of feature vectors 700 as input, feature vector summarizer 604 may take the average of each of the vector entries, to form context summary feature vector 702. For example, if the majority of feature vectors 700 indicate that a particular feature was present in the traffic of those endpoint devices, feature vector summarizer 604 may similarly set the entry for that feature within summary feature vector 702. As would be appreciated, feature vector summarizer 604 can use other approaches, as well, such as only setting the top N-number of averaged entries, etc.

Referring again to FIG. 6, in further embodiments, feature vector summarizer 604 may employ more advanced machine learning or statistics techniques, to produce a summary feature vector. In particular, these techniques may be more robust to outliers. With averaging or similar techniques detailed above, a couple feature vectors that are very different may significantly bias the summary feature vector. The cause for these outliers may be as simple as data collection issues or network outages or transformations resulting in some of the traffic not being sent or captured. On the other hand, feature vector summarizer 604 can also use statistical techniques to make the summary feature vectors more robust and ensure they are not affected by a limited number of outliers. For example, feature vector summarizer 604 may employ any number of robust mean estimation techniques, such as using regression with Huber's loss or the 11-loss. Feature vector summarizer 604 can also add regularization to the loss, to encourage sparsity of the summary (i.e., attempt to extract a set of usual characteristics in the context that doesn't have too many characteristics). In both cases, the goal of feature vector summarizer 604 is to extract common characteristics in a given context.

In another embodiment, feature vector summarizer 604 may employ a largely different mechanism, somewhat orthogonally, if information about the type of some of the endpoint devices is known. For instance, assume that the profiling of some endpoint devices is quite easy and these devices tend to generate network traffic with very little variability (e.g., an IP phone, a laptop of a certain kind, etc.). If a profile of the network traffic for those devices is available, and some of those devices are available in the current context, the characteristics activated in the feature vector that are not part of the standard profile of the device are very likely to be part of the context. Note also that such "core" profiles can be built by feature vector summarizer 604 using, for example, subject matter expertise by limiting the feature vector to known feature that are specific of the device behavior (e.g. type of application being used, etc.). Feature vector summarizer 604 can leverage this in the following way:

For each device type for which a profile exists, subtract/remove the characteristics from the profile from the feature vector of the matching devices in the current context.

Run the summarization process on those cleaned up vectors.

Feature vector summarizer 604 can also combine this approach with the previous mechanisms by not running the summarization process only on the cleaned up feature vectors, but on all vectors, such as after cleaning up the feature vectors of the devices matching a profile. Profiles can be gathered by device classification process 248, for example, as part of entering rules or learning machine learning classifiers. In that sense, there exists a slight feedback loop in the system.

FIG. 7B illustrates an example of the application of a device type profile to a feature vector for an endpoint device, in some embodiments. As shown, assume that a particular endpoint, Device 1, has an associated telemetry feature vector 710 and belongs to a particular context group undergoing summarization (e.g., by feature vector summarizer 604 in FIG. 6). In such a case, further assume that Device 1 also matches a particular device type profile 712 that is also of the form of an m-dimensional feature vector. Prior to using vector 710 for summarization of the context, device type profile 712 can be subtracted from feature vector 710, resulting in telemetry feature vector 710a. Feature vector 710a can then be used as part of the summarization of the context, as illustrated previously in FIG. 7A. By removing those feature entries in feature vector 710 that match device type profile 712, this helps to further summarize the traffic of the endpoint devices in the context group.

Referring again to FIG. 6, a further component of architecture 600 is feature vector normalizer 606 that immediately normalizes each input telemetry feature vector from telemetry data 610 and forwards the output to device type classifier 608, in various embodiments. For a given input telemetry feature vector, feature vector normalizer 606 processes each context that context assigner 602 assigned to the endpoint device associated with the feature vector, potentially from least specific to most specific. For each context, feature vector normalizer 606 may normalize the feature vector in some manner using the summary feature vector for that context produced by feature vector summarizer 604.

Depending on the specifics of the system, feature vector normalizer 606 may use any number of different normalization mechanisms, to normalize the telemetry feature vector of a given endpoint device. For example, when the features in the feature vector are binary indicators, as described above, feature vector normalizer 606 can use the context summary feature vector from feature vector summarizer 604 as a mask to set to zero in the input feature vector all coordinates present in the summary feature vector. In further cases, when the features are weighted or volumetric, feature vector normalizer 606 can use per-coordinate subtractions and/or divisions. In this setting, this is akin to a context-localized mean-and-standard-deviation normalization.

Finally, architecture 600 may also include device type classifier 608 that uses the telemetry feature vectors normalized by feature vector normalizer 606 to label the associated endpoint device with a device type 612. Note that, in various embodiments, classifier 608 can do so based on hard-coded rules, dynamic rules, machine learning or statistical models, etc. In addition, device classification process 248 can collect and archive the normalized feature vectors from feature vector normalizer 606 in a data lake for improvement or quality evaluation purposes. The function of de-noising provided by such an approach may then be distributed by process 248 in the network where device type classifier 608 performs the classification (e.g. at the edge of the network, on a identity services engine, in the cloud, etc.). In other words, device type classifier 608 can be located entirely or partially in the cloud or, alternatively, on premise in the network for which classifier 608 performs classifications.

Figure 8:
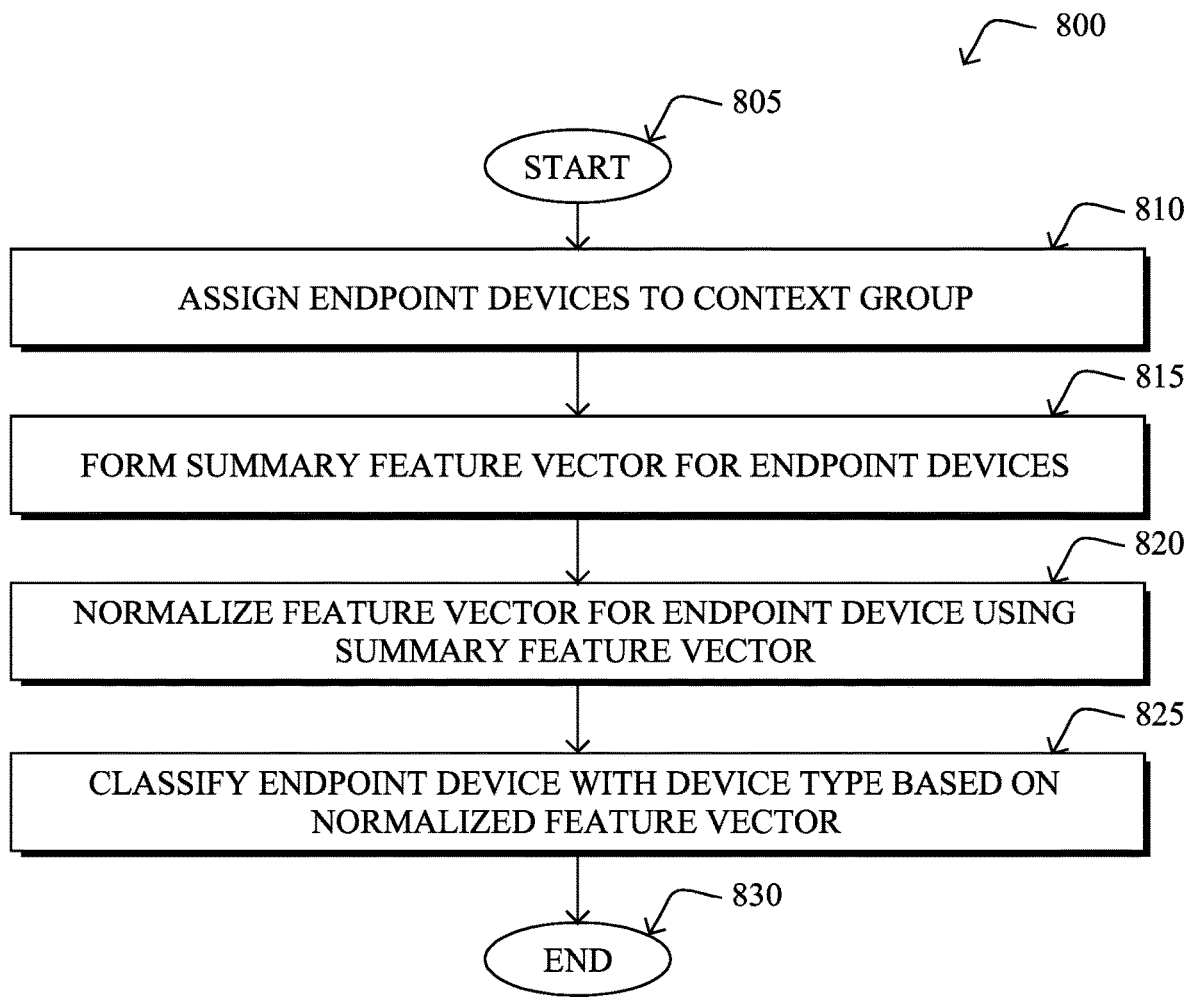
FIG. 8 illustrates an example simplified procedure for the removal of context from network traffic data for device classification.

FIG. 8 illustrates an example simplified procedure for the removal of context from network traffic data for device classification, in accordance with one or more embodiments described herein. For example, a non-generic, specifically configured device (e.g., device 200) may perform procedure 800 by executing stored instructions (e.g., process 248), so as to provide a device classification service. The procedure 800 may start at step 805, and continues to step 810, where, as described in greater detail above, the device classification service may assign a set of endpoint devices in a network to a context group. Generally, a context group may comprise endpoints that share common environmental characteristics, such as being in the same location, attached to the same networking device (e.g., AP, WLC, etc.), or the like. Accordingly, in some cases, the context of the context group may belong to a hierarch of contexts that varies by specificity.

At step 815, as detailed above, the device classification service may form a context summary feature vector for the context group that summarizes telemetry feature vectors for the endpoint devices assigned to the context group. In general, each telemetry feature vector may be indicative of a plurality of traffic features observed for the endpoint devices. For example, each entry of a feature vector may indicate the presence or absence of a network traffic protocol observed in network traffic of that endpoint device. In some embodiments, the service may form the context summary feature vector by averaging the entries of the feature vectors in the context group. In further embodiments, the service may include only the top N-number of most prevalent entries in the context group for the context summary feature vector. In yet additional embodiments, the service may first subtract out any features from the feature vector for a given endpoint device that are part of a profile associated with that endpoint and use the post-subtraction feature vector to form the context summary feature vector.

At step 820, the device classification service may normalize a telemetry feature vector for a particular endpoint device using the context summary feature vector, as described in greater detail. For example, the service may subtract the summary feature vector from the feature vector for the particular endpoint device. As would be appreciated, subtracting out the features that are context-related from the feature vector of the particular endpoint device helps to focus the traffic information for the device on those features that are attributable to the device and not the environment/ location of the device.

At step 825, as detailed above, the device classification service may classify, using the normalized telemetry feature vector for the particular endpoint device as input to a device type classifier, the particular endpoint device as being of a particular device type. In various embodiments, the classifier may use machine learning, statistical models, predefined rules, or the like, to assign a device type to the endpoint device, based on its normalized feature vector. In turn, the service may provide an indication of the classification to one or more networking devices in the network of the particular endpoint device, to apply a network policy to the traffic of that endpoint based on its device type. Procedure 800 then ends at step 830.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for better device classification by removing out those traffic features of an endpoint device that are attributable to the context of the device and not the device itself.

While there have been shown and described illustrative embodiments that provide for the removal of environmental and local context from network traffic for device classification, it is to be understood that various other adaptations and modifications may be made within the spirit and scope of the embodiments herein. For example, while certain embodiments are described herein with respect to using certain models for purposes of classifying endpoint devices with device types, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:
1. A method comprising:
assigning, by a device classification service, a set of endpoint devices of a network to a context group;
forming, by the device classification service, a context summary feature vector for the context group that summarizes telemetry feature vectors for the endpoint devices assigned to the context group, wherein each telemetry feature vector is indicative of a plurality of traffic features observed for the endpoint devices;
normalizing, by the device classification service, a telemetry feature vector for a particular endpoint device using the context summary feature vector to strip the telemetry feature vector of context; and
classifying, by the device classification service and using the normalized telemetry feature vector for the particular endpoint device as input to a device type classifier, the particular endpoint device as being of a particular device type, wherein the device type classifier, by the device classification service, is provided to one or more other device classification services associated with one or more other networks to enable reuse of the device type classifier to classify new traffic flows by normalizing telemetry feature vectors for the new traffic flows using the context summary feature vector.

2. The method as in claim 1, wherein the endpoint devices assigned to the context group are located in a common location.

3. The method as in claim 1, wherein the telemetry feature vector for an endpoint device comprises binary indicators of the presence or absence of a plurality of network traffic protocols observed in network traffic of that endpoint device.

4. The method as in claim 1, further comprising:
providing, by the device classification service, an indication of the device type to a networking device, wherein the networking device applies a network policy to traffic of the particular endpoint device based on the indicated device type of the particular endpoint device.

5. The method as in claim 1, wherein forming the context summary feature vector for the context group that summarizes telemetry feature vectors for the endpoint devices assigned to the context group comprises:
averaging the telemetry feature vectors for the endpoint devices assigned to the context group into the context summary feature vector.

6. The method as in claim 1, wherein forming the context summary feature vector for the context group that summarizes telemetry feature vectors for the endpoint devices assigned to the context group comprises:
identifying, for one of the endpoint devices assigned to the context group, a device profile for that endpoint device;
subtracting a device profile feature vector associated with the identified device profile from the telemetry feature vector for the endpoint device for which the device profile was identified, wherein the context summary feature vector is formed based in part on the telemetry feature vector for that endpoint device after the subtraction.

7. The method as in claim 1, wherein normalizing the telemetry feature vector for the particular endpoint device using the context summary feature vector comprises:
subtracting the context summary feature vector from the telemetry feature vector for the particular endpoint device.

8. The method as in claim 1, further comprising:
normalizing the telemetry feature vector for the particular endpoint device using one or more other context summary feature vectors for one or more other context groups, wherein the context group and the one or more other context groups belong to a hierarch of context groups.

9. The method as in claim 1, wherein the device type classifier is a machine learning-based classifier that classifies the device in the one or more networks, based on its corresponding network traffic.

10. An apparatus, comprising:
one or more network interfaces to communicate with a network;
a processor coupled to the network interfaces and configured to execute one or more processes; and
a memory configured to store a process executable by the processor, the process when executed configured to:
assign a set of endpoint devices to a context group;
form a context summary feature vector for the context group that summarizes telemetry feature vectors for the endpoint devices assigned to the context group, wherein each telemetry feature vector is indicative of a plurality of traffic features observed for the endpoint devices;
normalize a telemetry feature vector for a particular endpoint device, using the context summary feature vector to strip the telemetry feature vector of context; and
classify and use the normalized telemetry feature vector for the particular endpoint device as input to a device type classifier, the particular endpoint device as being of a particular device type, wherein the device type classifier, by a device classification service, is provided to one or more other device classification services associated with one or more other networks to enable reuse of the device type classifier to classify new traffic flows by normalizing telemetry feature vectors for the new traffic flows using the context summary feature vector.

11. The apparatus as in claim 10, wherein the endpoint devices assigned to the context group are located in a common location.

12. The apparatus as in claim 10, wherein the telemetry feature vector for an endpoint device comprises binary indicators of the presence or absence of a plurality of network traffic protocols observed in network traffic of that endpoint device.

13. The apparatus as in claim 10, wherein the process when executed is further configured to:
provide an indication of the device type to a networking device, wherein the networking device applies a network policy to traffic of the particular endpoint device based on the indicated device type of the particular endpoint device.

14. The apparatus as in claim 10, wherein the apparatus forms the context summary feature vector for the context group that summarizes telemetry feature vectors for the endpoint devices assigned to the context group by:
averaging the telemetry feature vectors for the endpoint devices assigned to the context group into the context summary feature vector.

15. The apparatus as in claim 10, wherein the apparatus forms the context summary feature vector for the context group that summarizes telemetry feature vectors for the endpoint devices assigned to the context group by:

identifying, for one of the endpoint devices assigned to the context group, a device profile for that endpoint device;
subtracting a device profile feature vector associated with the identified device profile from the telemetry feature vector for the endpoint device for which the device profile was identified, wherein the context summary feature vector is formed based in part on the telemetry feature vector for that endpoint device after the subtraction.

16. The apparatus as in claim 10, wherein the apparatus normalizes the telemetry feature vector for the particular endpoint device using the context summary feature vector by:
subtracting the context summary feature vector from the telemetry feature vector for the particular endpoint device.

17. The apparatus as in claim 10, wherein the process when executed is further configured to:
normalize the telemetry feature vector for the particular endpoint device using one or more other context summary feature vectors for one or more other context groups, wherein the context group and the one or more other context groups belong to a hierarch of context groups.

18. The apparatus as in claim 10, wherein the device type classifier is a machine learning-based classifier that classifies the device in the one or more networks, based on its corresponding network traffic.

19. A tangible, non-transitory, computer-readable medium storing program instructions that cause a device classification service to execute a process comprising:
assigning, by a device classification service, a set of endpoint devices of a network to a context group;
forming, by the device classification service, a context summary feature vector for the context group that summarizes telemetry feature vectors for the endpoint devices assigned to the context group, wherein each telemetry feature vector is indicative of a plurality of traffic features observed for the endpoint devices;
normalizing, by the device classification service, a telemetry feature vector for a particular endpoint device using the context summary feature vector to strip the telemetry feature vector of context; and
classifying, by the device classification service and using the normalized telemetry feature vector for the particular endpoint device as input to a device type classifier, the particular endpoint device as being of a particular device type, wherein the device type classifier, by the device classification service, is provided to one or more other device classification services associated with one or more other networks to enable reuse of the device type classifier to classify new traffic flows by normalizing telemetry feature vectors for the new traffic flows using the context summary feature vector.

20. The computer-readable medium as in claim 19, wherein the telemetry feature vector for an endpoint device comprises binary indicators of the presence or absence of a plurality of network traffic protocols observed in network traffic of that endpoint device.

* * * * *